United States Patent
Tell et al.

(10) Patent No.: US 7,415,595 B2
(45) Date of Patent: Aug. 19, 2008

(54) DATA PROCESSING WITHOUT PROCESSOR CORE INTERVENTION BY CHAIN OF ACCELERATORS SELECTIVELY COUPLED BY PROGRAMMABLE INTERCONNECT NETWORK AND TO MEMORY

(75) Inventors: Eric Johan Tell, Linköping (SE); Anders Henrik Nilsson, Linköping (SE); Dake Liu, Linköping (SE)

(73) Assignee: Coresonic AB, Johanneshov (SE)

( * ) Notice: Subject to any disclaimer, the term of this patent is extended or adjusted under 35 U.S.C. 154(b) by 366 days.

(21) Appl. No.: 11/135,964

(22) Filed: May 24, 2005

(65) Prior Publication Data

US 2006/0271765 A1 Nov. 30, 2006

(51) Int. Cl.
*G06F 15/16* (2006.01)
(52) U.S. Cl. .......................... 712/32; 712/28; 712/201
(58) Field of Classification Search ...................... None
See application file for complete search history.

(56) References Cited

U.S. PATENT DOCUMENTS

| | | | |
|---|---|---|---|
| 4,760,525 A | | 7/1988 | Webb |
| 5,226,125 A * | | 7/1993 | Balmer et al. .............. 710/317 |
| 5,361,367 A | | 11/1994 | Fijany et al. |
| 5,491,828 A | | 2/1996 | Intrater et al. |
| 5,805,875 A | | 9/1998 | Asanovic |
| 5,987,556 A | | 11/1999 | Nakagawa et al. |
| 6,795,686 B2 * | | 9/2004 | Master et al. .............. 455/11.1 |
| 7,159,099 B2 * | | 1/2007 | Lucas et al. ................ 712/218 |
| 2002/0186043 A1 | | 12/2002 | Sihlborn |
| 2003/0005261 A1 | | 1/2003 | Sheaffer |
| 2003/0172249 A1 | | 9/2003 | Ganapathy et al. |
| 2003/0212728 A1 | | 11/2003 | Dagan et al. |
| 2004/0001296 A1 * | | 1/2004 | Saito et al. ................. 361/115 |
| 2004/0019621 A1 * | | 1/2004 | Morikawa et al. ........... 708/401 |
| 2004/0019765 A1 | | 1/2004 | Klenin |
| 2005/0091472 A1 | | 4/2005 | Master |
| 2005/0278502 A1 | | 12/2005 | Hundley |

FOREIGN PATENT DOCUMENTS

| | | |
|---|---|---|
| WO | 9749042 | 12/1997 |

(Continued)

OTHER PUBLICATIONS

Nilsson, et al, "An accelerator structure for programmable multi-standard baseband processors," Proceedings of the IAESTED Wireless Networks Conference, Jul. 2004.

(Continued)

*Primary Examiner*—Kenneth S. Kim
(74) *Attorney, Agent, or Firm*—Meyertons Hood Kivlin Kowert & Goetzel, P.C.; Stephen J. Curran

(57) ABSTRACT

A programmable digital signal processor includes a plurality of memory units, a plurality of accelerator units and a processor core. The digital signal processor also includes a programmable network that may be configured to selectively provide connectivity between the memory units, the accelerator units, and the processor core. Each of the accelerator units may be configured to perform one or more dedicated functions. The processor core may include an execution unit that may be configured to execute instructions that are associated with datapath flow control. The programmable network may be configured to selectively provide the connectivity in response to execution of particular instructions.

32 Claims, 6 Drawing Sheets

FOREIGN PATENT DOCUMENTS

WO   03054722   7/2003

OTHER PUBLICATIONS

Glossner, et al, "A Multithreaded Processor Architecture for SDR," Proceedings of the Korean Institute of Communication Sciences, pp. 70-85, Nov. 2002, vol. 19, No. 11, http://ce.et.tudelft.nl/publicationfiles/625_22_sandbridge_korean_institute_paper.pdf.

Brash, "The ARM Architecture Version 6 (ARMv6)", Jan. 2002, http://www.arm.com/support/White_Papers.

International Preliminary Report on Patentability in application No. PCT/SE2006/000602 issued Nov. 29, 2007.

International Search Report in application No. PCT/SE2006/000602.

Written Opinion in application No. PCT/SE2006/000602 mailed Sep. 15, 2006.

Corrected form PCT/ISA/237 n application No. PCT/SE2006/000602 mailed Oct. 20, 2006.

* cited by examiner

| Process Pipeline Stage 1 | Process Pipeline Stage 2 | Process Pipeline Stage 3 |
|---|---|---|
| Processor core configures network Connect ADC/Accel to DM0 600 | | |
| ADC/Accel Receives and operates on Odd Symbols; writes samples to DM0, send int. 605 | | |
| Processor core reconfigures network; connect ADC/Accel to DM1 and processor core to DM0 and DM2 to 610 | | |
| ADC/Accel Receives and operates on Even Symbols; writes samples to DM1, send int. 615 | Processor core operates on data in DM0 635 | |
| ⋮ | Processor core sends result of operations to DM2, notify control unit 640 | |
| Processor core configures network Connect ADC/Accel to DM0 620 | Processor core reconfigures network; interconnect accelerators in a chain and connect DM2 to chain 645 | |
| ADC/Accel Receives and operates on Odd Symbols; writes samples to DM0, send int. 625 | ⋮ | Accelerator chain operates on data in DM2; send results to MAC processor, send interrupt 660 |
| Processor core reconfigures network; connect ADC/Accel to DM1 and processor core to DM0 and DM2 to 630 | Processor core operates on data in DM1 650 | ⋮ |
| ⋮ | Processor core sends result of operations to DM3, notify control unit 655 | Processor core reconfigures network; connect DM3 to chain 665 |
| | ⋮ | Accelerator chain operates on data in DM3; send results to MAC processor, send interrupt 670 |

FIG. 7

DATA PROCESSING WITHOUT PROCESSOR CORE INTERVENTION BY CHAIN OF ACCELERATORS SELECTIVELY COUPLED BY PROGRAMMABLE INTERCONNECT NETWORK AND TO MEMORY

BACKGROUND OF THE INVENTION

1. Field of the Invention

This invention relates to digital signal processors and, more particularly, to programmable digital signal processors.

2. Description of the Related Art

In a relatively short period of time, the use of wireless devices and especially mobile telephones has increased dramatically. This worldwide proliferation of wireless devices has lead to a large number of emerging radio standards and a convergence of wireless products. This in turn has lead to an increasing interest in Software Defined Radio (SDR).

SDR, as described by the SDR Forum, is "a collection of hardware and software technologies that enable reconfigurable system architectures for wireless networks and user terminals. SDR provides an efficient and comparatively inexpensive solution to the problem of building multi-mode, multi-band, multi-functional wireless devices that can be enhanced using software upgrades. As such, SDR may be considered an enabling technology that is applicable across a wide range of areas within the wireless industry."

Many wireless communication devices use a radio transceiver that includes one or more digital signal processors (DSP). One type of DSP used in the radio is a baseband processor (BBP), which may handle many of the signal processing functions associated with processing of the received the radio signal and preparing signals for transmission. For example, a BBP may provide modulation and demodulation, as well as channel coding and synchronization functionality.

Many conventional BBPs are implemented as Application Specific Integrated Circuit (ASIC) devices, which may support a single radio standard. In many cases, ASIC BBPs may provide excellent performance. However, ASIC solutions may be limited to operate within the radio standard for which the on-chip hardware was designed.

To provide an SDR solution, increased flexibility may be needed in radio baseband processors to meet requirements for time to market, cost and product lifetime. To handle the requirements of demanding applications such as Wireless Local Area Networks (LAN), third/fourth generation mobile telephony, and digital video broadcasting, a large degree of parallelism may be needed in the baseband processor.

To that end, various programmable BBP (PBBP) solutions have been suggested that are typically based on highly complex very long instruction word (VLIW) and/or multiple processor core machines. These conventional PBBP solutions may have drawbacks such as increased die area and possibly limited performance when compared to their ASIC counterparts. Thus, it may be desirable to have a programmable DSP architecture that may support a large number of different modulation techniques, bandwidth and mobility requirements, and may have acceptable area and power consumption.

SUMMARY

Various embodiments of a programmable baseband digital signal processor including a programmable network are disclosed. In one embodiment, a digital signal processor includes a plurality of memory units, a plurality of accelerator units and a processor core. The digital signal processor also includes a programmable network that may be configured to selectively provide connectivity between the memory units, the accelerator units, and the processor core. Each of the accelerator units may be configured to perform one or more dedicated functions independent of the processor core. The processor core may include an execution unit that may be configured to execute instructions that are associated with datapath flow control. The programmable network may be configured to selectively provide the connectivity in response to execution of the instructions.

In one specific implementation, in response to execution of a particular instruction, the programmable network may be configured to couple a given one of the memory units to a given one of the accelerator units.

In another specific implementation, in response to execution of a particular instruction, the programmable network may be configured to couple one or more memory units to the processor core.

In yet another specific implementation, in response to execution of a particular instruction, the programmable network is configured to couple together, in a chain, two or more accelerator units and to further couple a first accelerator unit of the chain to one of a given one of the memory units and the processor core.

In another embodiment, a wireless communication device includes a radio frequency front-end unit configured to transmit and receive radio frequency signals and a programmable digital signal processor coupled to the radio frequency front-end unit. One such digital signal processor may be a baseband digital signal processor. The programmable digital signal processor includes a plurality of memory units, a plurality of accelerator units and a processor core. The programmable digital signal processor also includes a programmable network that may be configured to selectively provide connectivity between the memory units, the accelerator units, and the processor core. Each of the accelerator units may be configured to perform one or more dedicated functions associated independent of the processor core. The processor core may include an execution unit that may be configured to execute instructions that are associated with datapath flow control. The programmable network may be configured to selectively provide the connectivity in response to execution of the instructions.

BRIEF DESCRIPTION OF THE DRAWINGS

FIG. 7 is a pipeline flow diagram that describes exemplary operation of the embodiment of the programmable baseband processor of FIG. 1, FIG. 2 and FIG. 4.

Figure 1:
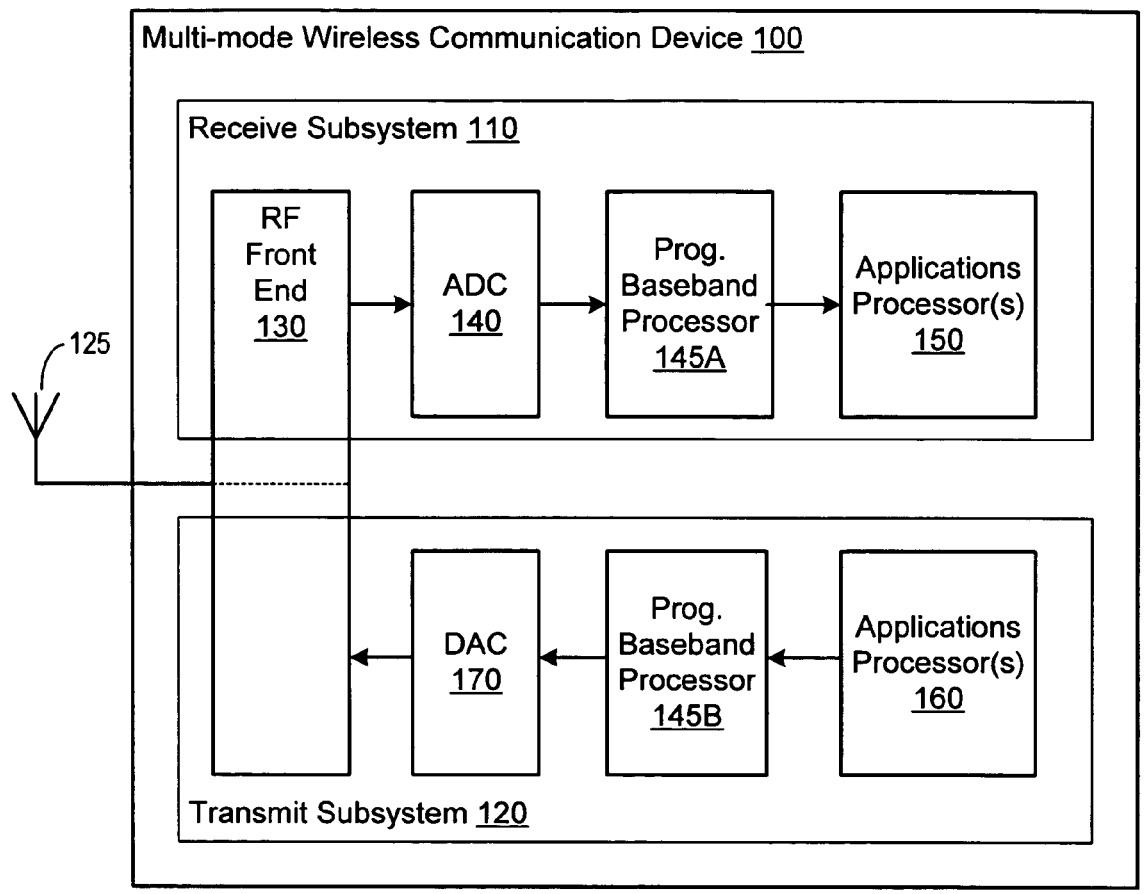
FIG. 1 is a block diagram of one embodiment of a multi-mode wireless communication device including a programmable baseband processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a multi-mode wireless communication device including a programmable baseband processor is shown. In the illustrated embodiment, some of the basic partitioning of a radio communication system from both functional and hardware points of view are shown. More particularly, the multimode wireless communication device 100 includes a receive subsystem 110 and a transmit subsystem 120, each of which is coupled to antenna 125. It is noted that in various embodiments, multi-mode wireless communication device may be a hand-held mobile telephony device or the like. It is further noted that components having a reference designator that includes both a number and a letter may be referred to by just the number where appropriate.

Receive subsystem 110 includes a portion of RF front end 130 that is coupled to an analog-to-digital converter (ADC) 140. The ADC 140 is coupled to programmable baseband processor (PBBP) 145A, which is in turn coupled to application processor(s) 150. Transmit subsystem 120 includes applications processor(s) 160 coupled to PBBP 145B, which is coupled to digital-to-analog converter (DAC) 170. DAC 170 is also coupled to a portion of RF front end 130. It is noted that PBBP 145A and 145B may be implemented as one programmable processor and in some embodiments they may be manufactured on a single integrated circuit. It is also noted that in some embodiments ADC 140 may be implemented as part of PBBP 145A.

PBBP 145 performs many functions in both transmit subsystem 120 and receive subsystem 110. Within transmit subsystem 120, the PBBP 145B may convert data from application sources to a format adapted to the radio channel. For example, transmit subsystem 120 may perform functions such as channel coding, digital modulation, and symbol shaping. Channel coding refers to using different methods for error correction (e.g., convolutional coding) and error detection (e.g., using a cyclic redundancy code (CRC)). Digital modulation refers to the process of mapping a bit stream to a stream of complex samples. The first (and sometimes the only) step in the digital modulation is to map groups of bits to a specific signal constellation, such as Binary Phase Shift Keying (BPSK), Quadrature Phase Shift Keying (QPSK), or Quadrature Amplitude Modulation (QAM). There are various ways of mapping groups of bits to the amplitude and phase of a radio signal. In some cases, a second step, domain translation, may be applied. In an Orthogonal Frequency Division Multiplexing (OFDM) system (i.e., a modulation method where information is sent over a large number of adjacent frequencies simultaneously), an Inverse Fast Fourier Transform (IFFT) may be used for this step. In a spread spectrum system such as Code Division Multiple Access (CDMA), for example, (a "spread spectrum" method of allowing multiple users to share the RF spectrum by assigning each active user an individual "code"), each symbol is multiplied with a spreading sequence of ones and minus ones. The final step is symbol shaping, which transforms the square wave to a band-limited signal using a finite impulse response (FIR) band pass filter. Since channel coding and mapping functions typically operate on a bit level (and not on a word level), they are generally not suitable for implementation in a programmable processor. However, as will be described in greater detail below, in various embodiments of PBBP 145, these functions and others may be implemented using one or more dedicated hardware accelerators.

PBBP 145 may perform such functions as synchronization, channel equalization, demodulation, and forward error correction. For example, receive subsystem 110 may recover symbols from the distorted analog baseband signal and translate them to a bit stream with an acceptable bit error rate (BER) for applications running in applications processor(s) 150.

Synchronization may be divided into several steps. The first step may include detecting an incoming signal or frame, and is sometimes referred to as "energy detection." In connection with this, operations such as antenna selection and gain control, may also be carried out. The next step is symbol synchronization, which aims to find the exact timing of the incoming symbols. All the preceding operations are typically based on complex auto- or cross-correlations.

In many cases, it may be necessary that receive subsystem 110 perform some kind of compensation for imperfections in the radio channel. This compensation is known as channel equalization. In OFDM systems, channel equalization may involve a simple scaling and rotation of each sub-carrier after performing an FFT. In a CDMA system, a "rake" receiver is often used to combine incoming signals from multiple signal paths with different path delays. In some systems, least mean square (LMS) adaptive filters may be used. Similar to synchronization, most operations involved in channel estimation and equalization may employ convolution-based algorithms. These algorithms are generally not similar enough to share the same fixed hardware in a conventional ASIC implementation. However they may be implemented efficiently on a programmable DSP processor such as PBBP 145.

Demodulation may be thought of as the opposite operation of modulation. Demodulation typically involves performing an FFT in OFDM systems and a correlation with spreading sequence or "de-spread" in CDMA systems. The last step of demodulation may be to convert the complex symbol to bits according to the signal constellation. Similar to channel coding, de-interleaving and channel decoding may not be suitable for firmware implementation. However, as described in greater detail below, Viterbi or Turbo decoding, which may be used for convolutional codes, are very demanding functions that may be implemented as one or more hardware accelerators.

Programmable Baseband Processor Architecture

Figure 2:
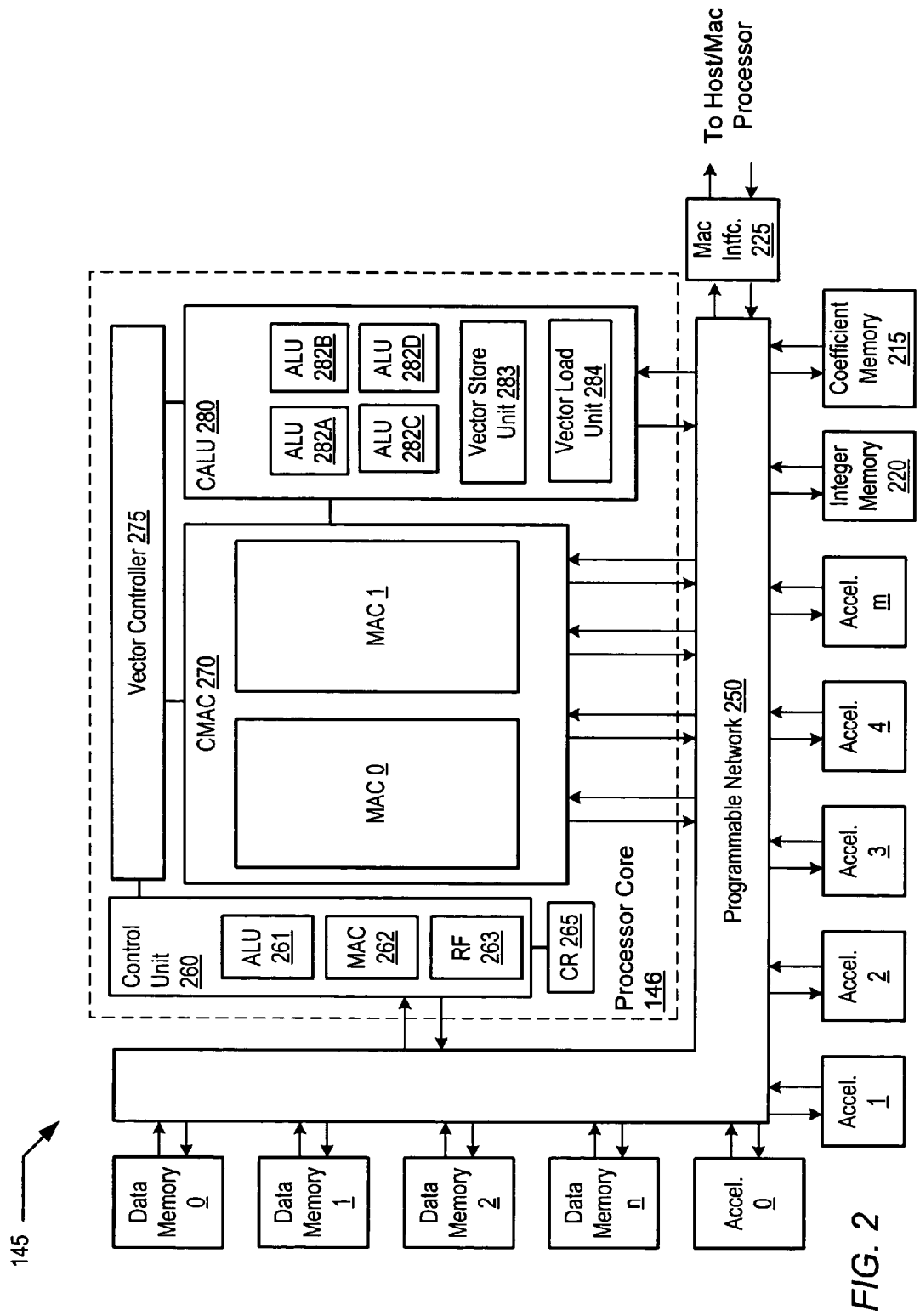
FIG. 2 is a block diagram of one embodiment of the programmable baseband processor of FIG. 1.

FIG. 2 illustrates a block diagram of one embodiment of the programmable baseband processor of FIG. 1. PBBP 145 may support different radio standards with multiple modes of operation (i.e., preamble reception, payload reception, and transmission) and different data rates, by providing dynamic reconfigurability. To achieve the desired reconfigurability, various embodiments of PBBP 145 may include a central processor core that manages the DSP flow by controlling the interconnection between the processor core, multiple memory units, and a variety of hardware accelerators using a programmable connection network.

Referring to FIG. 2, PBBP 145 includes a processor core 146 and a plurality of data memory units designated 0 through n, where n may be any number. PBBP 145 also includes a plurality of hardware accelerators, designated 0 through m, where m may be any number. In addition, PBBP 145 includes a programmable network 250 that is coupled between the processor core 146 and each of the data memories and the accelerators. Further, PBBP 145 includes integer and coefficient memory units, designated 220 and 215, respectively, each of which are coupled to the processor core 146 via programmable network 250. Lastly, PBBP 145 includes a medium access layer (MAC) interface unit 225 which is coupled between programmable network 250 and a Host/MAC processor (not shown).

The Processor Core

In the illustrated embodiment, processor core 146 includes a control unit 260 that is coupled to control registers CR 265 and to programmable network 250. The processor core 146 also includes a complex multiplier accumulator (CMAC) unit 270 and a complex arithmetic logic unit (CALU) 280 that are both independently coupled to programmable network 250. Processor core 146 further includes a vector controller 275A that is coupled to CMAC, 270 and a vector controller 275B that is coupled to CALU 280.

Control unit 260 includes an ALU 261, a separate multiplier accumulator unit 262 and a set of register files (RF) 263. In one embodiment, control unit 260 may function as a reduced instruction set controller (RISC) configured to execute integer instructions.

CALU 280 includes four ALUs each including an accumulator (not shown) and designated 282A though 282D. CALU 280 also includes a vector store unit 283 and vector load unit 284. It is noted that in one embodiment, vector store unit 283 and vector load unit 284 may be shared among the four ALUs, but they may function such that the four ALUs may operate in parallel. It is also noted that in one embodiment, vector controller 275A and 275B may be implemented as a single shared unit that may be shared between CMAC 270, and CALU 280.

CMAC 270 may be optimized for operations on vectors of complex numbers. Accordingly, CMAC 270 includes multiple complex data paths that may be run together or separately. In one embodiment, data paths CMAC 0 and CMAC 1 may each include two complex data paths that include multipliers, adders, and accumulator registers (all not shown). Thus, CMAC 270 may be referred to as a four-way CMAC datapath. In addition to multiplying and adding, each of CMAC 0 and CMAC 1 may also perform rounding and scaling operations and support saturation. In one embodiment, CMAC 270 operations may be divided into three pipeline steps. In addition, each of CMAC 0 and CMAC 1 may execute an operation on an N-element vector in N/2 clock cycles. Further, CMAC 0 and CMAC 1 may support operations on complex values stored in the accumulator registers (e.g., complex add, subtract, conjugate, etc). For example, CMAC 270, may compute a complex multiplication such as $(A_R+jA_1)^* (B_R+jB_1)$ in one clock cycle and complex accumulation in one clock cycle and support complex vector computing (e.g., complex convolution, conjugate complex convolution, and complex vector dot product).

In one embodiment, processor core 146 may function as a DSP processor having multiple single-instruction multiple-data (SIMD) execution units. More particularly, the datapaths may be grouped together into SIMD clusters in which each cluster may use vector controller 275A and 275B, vector store unit 283, and vector load unit 284. The clusters may execute different tasks while every data path within a cluster may perform a single instruction on multiple data each clock cycle. Specifically, the four-way CALU 280 and the four-way CMAC 270 may function as SIMD clusters to perform four parallel operations such as four correlations or de-spread of four different codes in parallel, for example. Similarly, CMAC 270 may perform two parallel Radix-2 FFT butterflies or one Radix-4 FFT butterfly, for example.

The Instruction Set Architecture

In one embodiment, the instruction set architecture for processor core 146 may include three classes of compound instructions. The first class of instructions are RISC instructions, which operate on 16-bit integer operands. The RISC-instruction class includes most of the control-oriented instructions and may be executed within control unit 260 of the processor core 146. The next class of instructions are DSP instructions, which operate on complex-valued data having a real portion and an imaginary portion. The DSP instructions may be executed on one or more of the SIMD-clusters. The third class of instructions are the Vector instructions. Vector instructions may be considered extensions of the DSP instructions since they operate on large data sets and may utilize advanced addressing modes and vector loop support. With few exceptions, the vector instruction set operates on complex data types.

Figure 3:
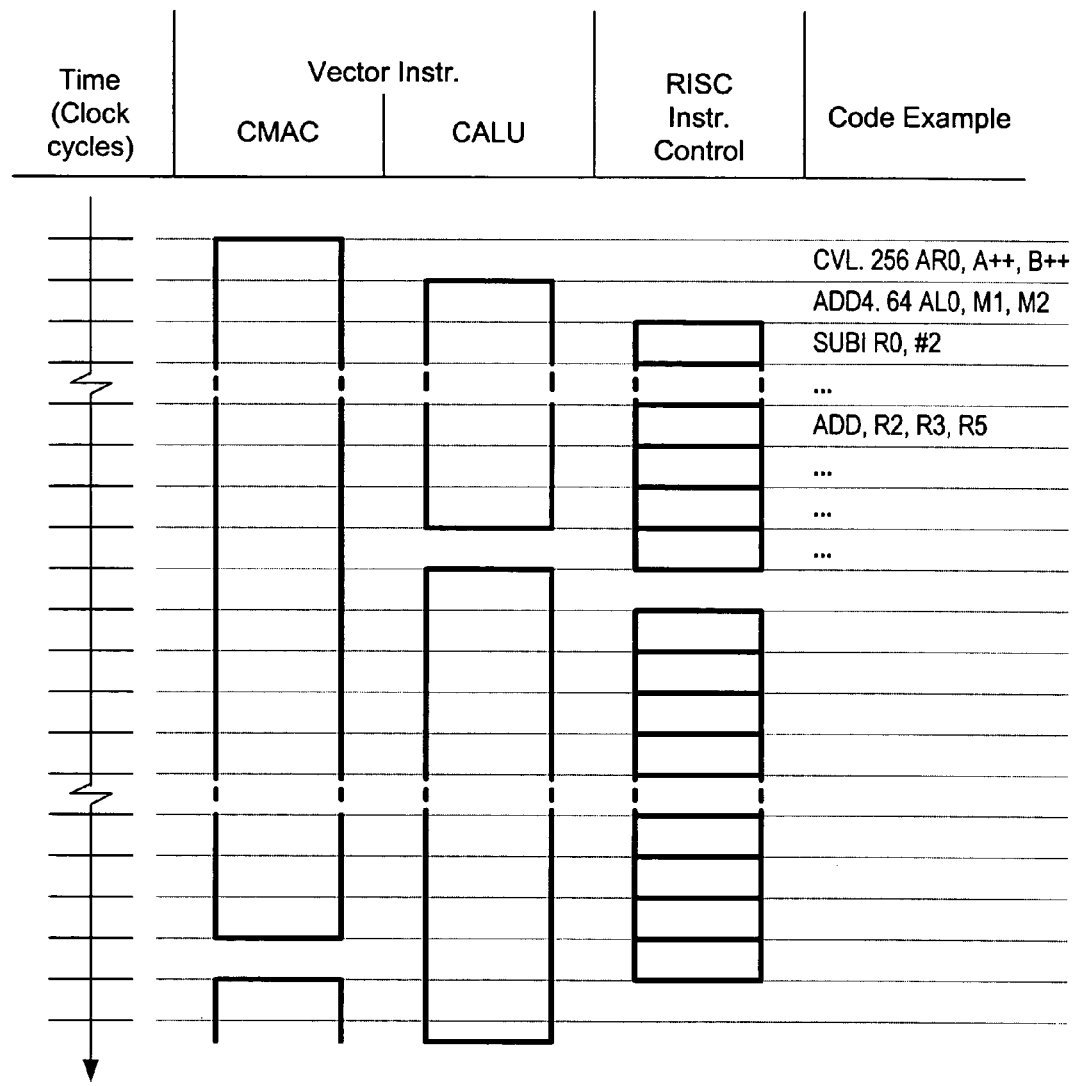
FIG. 3 is a diagram illustrating the instruction issue pipelines of one embodiment of the processor core of FIG. 2.

Many baseband receiving algorithms may be decomposed into task-chains with little backward dependencies between tasks. This property may not only allow different tasks to be performed in parallel on SIMI execution units, it may also be exploited using the above instruction set architecture. Vector operations may operate on large vectors, thus one instruction may be issued every clock cycle, thereby reducing the complexity of the control path. In addition, since vector SIMD instructions run on long vectors, many RISC instructions may be executed during the vector operation. As such, in one embodiment, processor core 146 may be a single instruction issue per clock cycle machine and each of the SIMD clusters and the integer execution unit may execute an instruction each clock cycle in a pipelined fashion. Thus, PBBP 145 may be thought of as running two threads in parallel. The first thread includes program flow and miscellaneous processing using control unit 260. The second thread includes complex vector computations executed on the SIMD clusters. FIG. 3 illustrates the instruction execution pipelines of one embodiment of the processor core of FIG. 2.

Referring collectively to FIG. 2 and FIG. 3, the left column of FIG. 3 represents time (in execution clock cycles). The remaining columns represent the execution pipelines of a complex SIMD cluster (e.g., CMAC 270 and CALU 280) and the control unit 260 and the issuance of instructions thereto. More particularly, in the first clock cycle, a complex vector instruction (e.g., CVL. 256) is issued to CMAC 270. As shown, the vector instruction takes many cycles to complete. In the next clock cycle, a vector instruction is issued to CALU 280. In the next clock cycle, an integer instruction is issued to control unit 260. In the next several cycles, while the vector instructions are being executed, any number of integer instructions may be issued to control unit 260.

It is noted that in one embodiment, to provide control flow synchronization and to control the data flow, "idle" instructions may be used to halt the control flow until a given vector operation is completed. For example, execution of certain vector instructions by a corresponding SIMD execution unit may cause an "idle" instruction to be executed by control unit 260. The "idle" instruction may halt the control unit 260 until an indication such as a flag, for example, is received from the corresponding SIMD execution unit by control unit 260.

The Hardware Accelerators

As described above, to provide multi-mode support across a wide range of radio standards, many baseband functions may be provided by dedicated hardware accelerators used in combination with a programmable core. For example, in one embodiment each of the following functions may be implemented using accelerators 0 through m of FIG. 2: a decimator/filter, a four "finger" RAKE function for use in CDMA and DSSS modulation schemes, a Radix-4 FFT/Modified Walsh transform for use in OFDM modulation schemes and in IEEE 802.11b, a demapper, a Convolutional/Turbo encoder-Viterbi decoder, a configurable block interleaver, a configurable scrambler, and a CRC accelerator. It is noted that in other embodiments, other numbers and types of functions may be implemented using accelerators 0 through m.

In one embodiment, the decimator/filter accelerator may include an ADC and a configurable filter such as a FIR filter that may be used for such standards as IEEE 802.11a and others. Similarly, the four-finger rake accelerator may include an accumulator unit and a simple complex multiplier capable of multiplying samples with values from the set {0±1 and 0±i}. The rake accelerator may also include a local complex memory for delay path storage, de-spread code generators and a matched filter (all not shown) that may perform multi-path search and channel estimation functions. The Radix-4 FFT/Modified Walsh transform (FFT/MWT) accelerator may include a Radix-4 butterfly (not shown) and flexible address generators (not shown). In one embodiment, the FFT/MWT accelerator may perform a 64-point FFT in 54 clock cycles and a modified Walsh transform in support of the IEEE 802.11b standard in 18 clock cycles. The Convolutional/Turbo encoder-Viterbi decoder accelerator may include a reconfigurable Viterbi decoder and a Turbo encoder/decoder to provide support for convolutional and turbo error correcting codes. In one embodiment, decoding of convolutional codes may be performed by the Viterbi algorithm, whereas Turbo codes may be decoded by utilizing a Soft output Viterbi algorithm. A configurable block interleaver accelerator may be used to reorder data to spread neighboring data bits in time, and in the OFDM case, among different frequencies. In addition, the scrambler accelerator may be used to scramble data with pseudo-random data to ensure an even distribution of ones and zeros in the transmitted data-stream. The CRC accelerator may include a linear feedback shift register (not shown) or other algorithm for generating CRC.

The Memory Units

To efficiently utilize the SIMD architecture of processor core 146, memory management and allocation may be important considerations. As such, the data memory system architecture includes several relatively small data memory units (e.g., DM0-DMn). In one embodiment, data memories DM0-DMn may be used for storing complex data during processing. Each of these memories may be implemented to have two interleaved memory banks, which may allow two consecutive addresses (vector elements) to be accessed in parallel. In addition, each of data memories DM0-DMn may include an address generation unit (e.g., 405A-405n shown in FIG. 4) that may be configured to perform modulo addressing as well as FFT addressing. As will be described further below, each of DM0-DMn may be independently and dynamically connected via the programmable network 250 to any of the accelerators and to the processor core 146. Coefficient memory 215 may be used for storing FFT and filter coefficients, lookup tables, and other data not processed by accelerators. Integer memory 220 may be used as a packet buffer to store a bitstream for the MAC interface 225. Coefficient memory 215 and integer memory 220 are both coupled to processor core 146 via programmable network 250.

The Programmable Network

Programmable network 250 is configured to interconnect data paths, memories, accelerators and external interfaces. Thus, programmable network 250 may behave similar to a crossbar in which the connections may be set up from one input (write-) port to one output (read-) port, and any input port may be connected to any output port in an N×M structure. Although in some embodiments, connections between some memories and some computing units may not be necessary. As such, programmable network 250 may be optimized to only allow certain memory configurations, thus simplifying programmable network 250. Having an interconnect such as programmable network 250 may eliminate the need for an arbiter and addressing logic, thus reducing the complexity of the network and the accelerator interfaces, while still allowing many concurrent communications. It is noted that in one embodiment, programmable network 250 may be implemented using multiplexers or a combinatorial logic structure such as an And-Or structure, for example.

In one embodiment, programmable network 250 may be implemented as two sub-networks. The first sub-network may be used for sample-based transfers and the second sub-network may be a serial network used for bit-based transfers. The division of the two networks may improve the throughput of the networks since bit-based transfers may require tedious framing and de-framing of data chunks that are not equal to the data width of the network. In such an embodiment, each sub-network may be implemented as a separate crossbar switch that is configured by processor core 146. Programmable network 250 may also be configured to allow accelerators having associated functionality to be connected directly to each other in a chain and with data memories. This type of network configuration may enable the data to flow seamlessly between accelerator units without the intervention of processor core 146, thereby enabling processor core 146 to be involved with the network only during creation and destruction of network connections.

As described above, it may not be necessary to connect all memories to all computing elements and programmable network 250 may be optimized to only allow certain memory configurations. In those embodiments, programmable network 250 may be referred to as a "partial network." To transfer data between these partial networks, several memory blocks within one or more data memory units (e.g., DM0) may be assigned to both sub-networks. These memory blocks may be used as ping-pong buffers between tasks. Costly memory moves may be avoided by "swapping" memory blocks between computing elements. This strategy may provide an efficient and predictable data flow without costly memory move operations.

Figure 4:
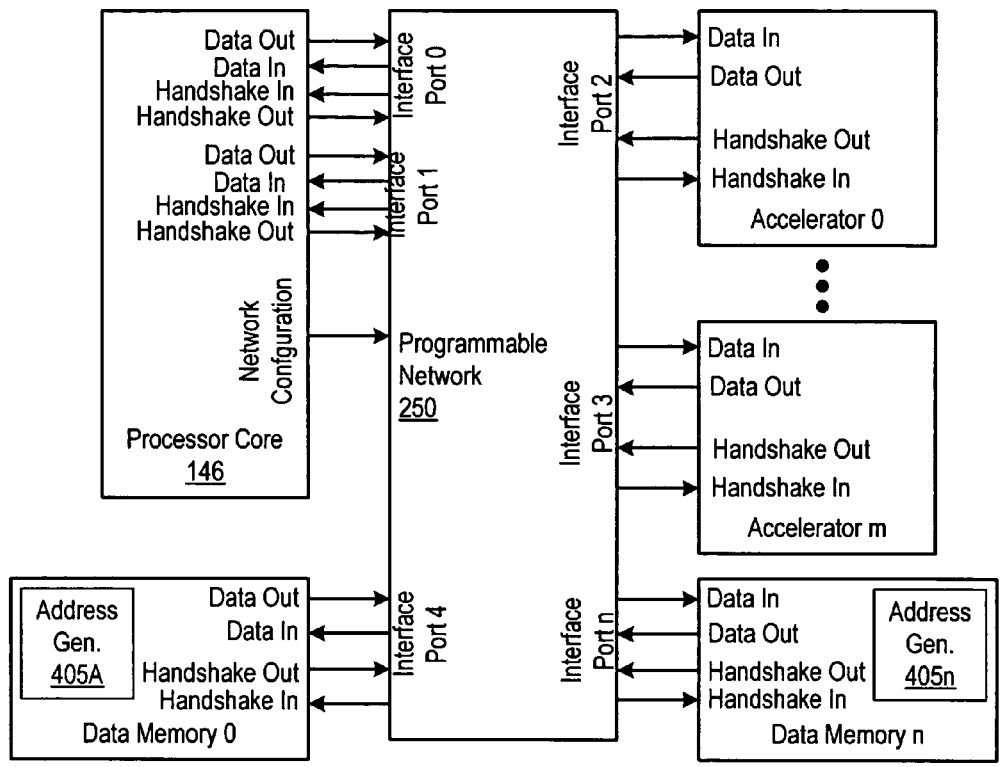
FIG. 4 is a diagram illustrating further aspects of the embodiment of the programmable baseband processor of FIG. 2.

FIG. 4 illustrates further aspects of the embodiment of the programmable network of FIG. 2. In the illustrated embodiment, each unit (e.g., processor core 146, DM0-n, accelerator 0-m, etc.) connected to programmable network 250 includes an interface port having at least one read/write port pair. Each read/write port pair includes "Data In" and "Data Out" signals and "Handshake In" and "Handshake Out" signals. In one embodiment, the data in/out signals may each be multi-bit datapaths, while the Handshake In signal may be a read request (RR) signal and the Handshake Out signal may be a data available (DAV) signal. Likewise, programmable network 250 includes a plurality of corresponding interface ports (e.g., interface ports 0-n) each having the same port signals.

In addition, processor core 146 includes a network configuration port that may e used to send network configuration information to programmable network 250. In one embodiment, processor core 146 may configure network connections by using dedicated assembly instructions or by writing configuration vectors to control registers such as control registers 265 of FIG. 2.

It is noted that since processor core 146 may be implemented as a clustered SIMI architecture, more than one data memory DM0-DMn may be connected to processor core 146 at the same time. When programmable network 250 is configured this way, each data memory may be connected to a respective SIMD cluster port.

Figure 5:
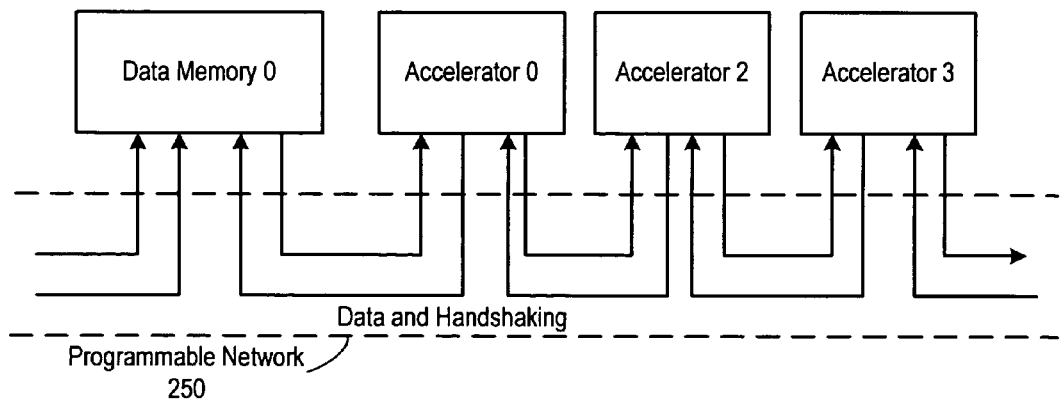
FIG. 5 is a diagram illustrating exemplary network connections within one embodiment of the programmable baseband processor of FIG. 2 and FIG. 4.

In addition, as illustrated in FIG. 5, the network interface ports of programmable network 250 allow connection of a chain of accelerators (e.g., accelerators 0, 2, 3) that may automatically synchronize and communicate between themselves and operate independently of (i.e., without any interaction by) the of the processor core 146 and in the absence of any kind of arbiter or network master unit. As mentioned above, this protocol may allow concurrent operation of processor core 146 and any number of accelerators, and with no synchronization overhead within processor core 146, thereby freeing processor core 146 to perform useful baseband processing. In addition, the number of memory accesses may be reduced, since no intermediate storage may be needed when sending data between accelerators.

Programmable network 250 may be configured to allow a given unit (e.g., processor core 146, accelerator 2, etc.) exclusive memory access for storing an algorithm output, thereby possibly eliminating stall cycles due to access conflicts. After finishing a task, the entire memory containing the output data can be "handed over" to an accelerator or interface by reconfiguration of programmable network 250, which may eliminate data moves between memories.

Figure 6A:
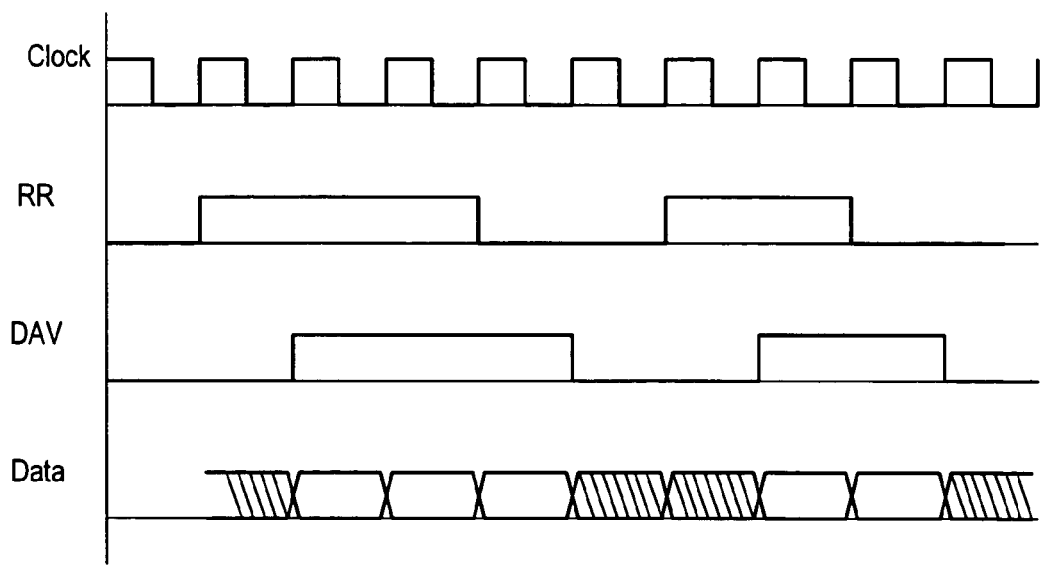
FIG. 6A is a timing diagram illustrating exemplary timing aspects between units connected to one embodiment of the programmable network of FIG. 2 and FIG. 4.
Figure 6B:
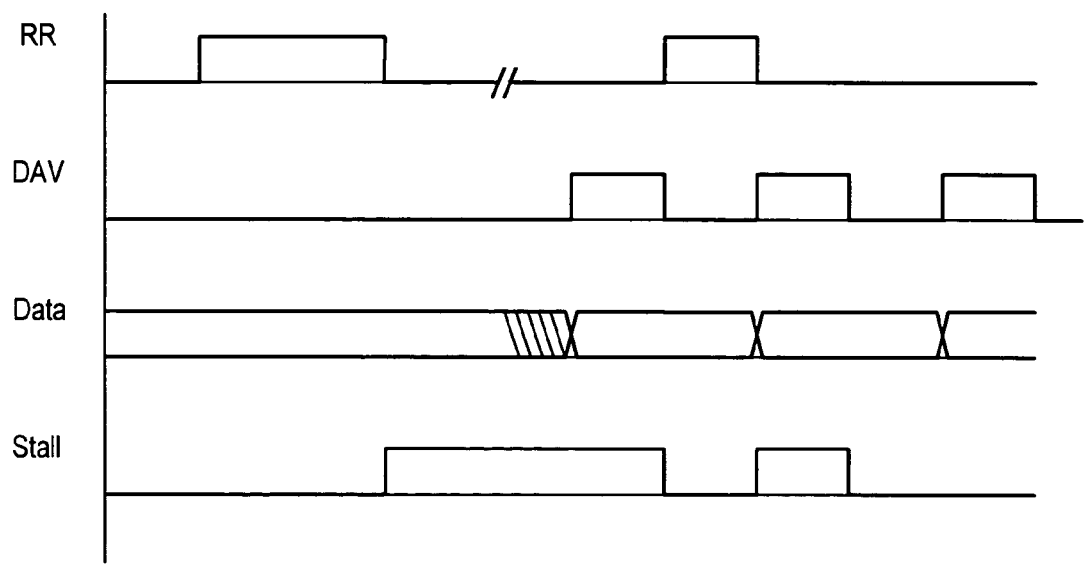
FIG. 6B is timing diagram illustrating other exemplary timing aspects between units connected to one embodiment of the programmable network of FIG. 2 and FIG. 4.

FIG. 6A and FIG. 6B are timing diagrams that illustrate the timing between units connected to one embodiment of programmable network 250. FIG. 6A illustrates exemplary memory request timing, while FIG. 6B illustrates exemplary timing of a data request to a unit (e.g., accelerator) that is slower than the requester. The timing diagram of FIG. 6A includes a clock signal, a read request signal (RR), a data available signal (DAV) and a data signal, while FIG. 6B includes an additional stall signal.

In one embodiment, the interface port logic within programmable network 250 and within each of processor core 146, accelerators 0-m, and data memories 0-n may be configured to automatically synchronize between units. Accordingly, once programmable network 250 has been configured by processor core 146 to connect two devices (e.g., processor core 146 and DM0), the RR signal of a device that is requesting data may not be idle as long as data is available. More particularly, if a sending unit is configured to provide data as fast as a requester can request it, the RR signal may not become idle as long as the requester needs data. As shown in FIG. 6A, the RR signal is asserted for three clock cycles by a requester. The next clock cycle after RR is asserted, DAV is asserted by the sender for three clock cycles, while the data is being sent. Accordingly, three "blocks" or units of data are sent over three clock cycles. Two cycles after RR is deasserted, the requester asserts RR again for two cycles. One cycle after RR is asserted, the sender asserts DAV for two cycles and the data is sent over those two cycles.

However, some senders may be not be able to provide data to the requester as fast as the requester may request the data. As such, the requester may be configured to stall the RR signal if there are more than two outstanding read request cycles. For example, in FIG. 6B, RR is asserted for two cycles and the sender has not asserted DAV. Accordingly, the requester stalls the RR signal until DAV is asserted for one cycle and data is sent. The RR signal is then asserted again, but only for one cycle since only one data cycle was sent, and there are again two outstanding requests. Thus, when a requester requests data from a slower sender, the requester may alternately assert and stall the RR signal to allow the sender to catch up. It is noted however, that in other embodiments, it is contemplated that a requester may stall after fewer or more than two outstanding requests.

FIG. 7 illustrates an exemplary pipelined operation of one embodiment of the programmable baseband processor of FIG. 2 and FIG. 4. During payload-processing operations associated with the IEEE 802.11a standard. In one embodiment, the processing flow may include receiving and processing even and odd symbols in three pipeline stages (i.e., at any given time, data from three different OFDM symbols (each including 80 input samples) may be processed in different parts of PBBP 145).

More particularly, during odd symbol interval stage 1, the odd symbols are received by the ADC front end/filter and samples are stored to DM0. During odd symbol interval stage 2, processor core 146 operates on even samples stored in DM1 and stores the results to DM3. During odd symbol interval stage 3, the accelerator chain independently operates on results stored in DM2 and transfers the results to the MAC-layer interface. Similarly, during even symbol interval stage 1, the even symbols are received by the ADC front end/filter and samples are stored to DM1. During even interval stage 2, processor core 146 operates on odd samples stored in DM0 and stores the results to DM2. During even interval stage 3, the accelerator chain independently operates on results stored in DM3 and transfers the results to the MAC-layer interface. As described above, programmable network 250 may be dynamically reconfigured during operation to facilitate data flow between accelerators, data memories and processor core 146. In addition, flow control may be provided between running processes using idle instructions, interrupts, and flags.

Referring collectively to FIG. 2 and FIG. 7, in the first pipeline stage, processor core 146 configures programmable network 250 to connect the decimator/filter accelerator (e.g., accelerator 0) to a data memory (e.g., DM 0) (block 600). When an odd OFDM symbol is received by accelerator 0 may perform decimation and frequency offset compensation and the compensated samples may be sent via the programmable network 250 to DM0. Upon receiving a complete symbol, in one embodiment, a sample counter function (not shown) within accelerator 0 may generate an interrupt to processor core 146 (block 605). In response to the interrupt, processor core 146 may reconfigure programmable network 250 to connect accelerator 0 a different data memory (e.g., DM1) such that the samples of the next symbol are transferred to DM1. At the substantially the same time, DM0 and another data memory (e.g., DM2) may be connected to processor core 146 (block 610). Accelerator 0 may now receive and operate on even symbols and write the corresponding samples to DM1 (block 615).

In the second pipeline stage, in response to the interrupt generated by accelerator 0, processor core 146 may operate on the samples stored within DM0. In one embodiment, processor core 146 may perform FFT and channel compensation on the symbol now available in DM0, as well as some phase and channel tracking tasks (block 635). The compensated frequency domain samples may be transferred from processor core 146 via programmable network 250 to DM2 (block 640).

When processor core 146 is finished sending the results to DM2, processor core 146 may reconfigure programmable network 250 by connecting additional accelerators (e.g., accelerators 1-4) in a chain and DM2 to the input of the chain (block 645). For example, the memory to accelerator chain may include connecting DM2 to a demapper, which may be connected to a de-interleaver, which may be connected to a Viterbi decoder, which may be connected to a MAC-layer interface. At substantially the same time, if accelerator 0 is finished sending even samples to DM1, processor core 146 may also cause programmable network 250 to reconnect accelerator 0 to DM0 (block 620) such that accelerator 0 may process the next odd symbol and store the samples to DM0 (block 625).

When accelerator 0 finishes with the next odd symbol, an interrupt is generated as described above in block 605. In response to the interrupt, processor core 146 may reconfigure programmable network 250 to connect accelerator 0 to DM1 and the processor core 146 to DM0 and to DM2 (block 630). It is noted that there may be times when processor core 146 may be idle. For example, it may be possible for processor core 146 to be waiting for accelerator 0 to finish storing samples to one of the data memories.

The third pipeline stage includes the accelerator chain operating on the results stored within DM2 independently of operations performed by processor core 146. For example, the accelerator chain may perform demapping and channel decoding operations and transferring the resultant bit stream to the MAC-layer interface (block 660). When the accelerator chain completes operations on the data in DM2, an interrupt may be generated by the accelerator chain to processor core 146. When the results are ready within DM3, processor core 146 may reconfigure programmable network 250 to connect DM3 to the input of the accelerator chain (block 665). The accelerator chain operates on the results stored within DM3 and transfers the resultant bit stream to the MAC-layer interface (block 670).

The flexible nature of the architecture and micro-architecture described above, PBBP 145 may provide support for multiple radio standards and multiple modes within those standards.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A digital signal processor comprising:
a plurality of independently accessible memory units;
a plurality of accelerator units, each configured to perform one or more dedicated functions;
a processor core including an execution unit configured to execute instructions associated with datapath flow control; and
a programmable network configured to selectively provide connectivity between the plurality of independently accessible memory units, the plurality of accelerator units, and the processor core in response to execution of the instructions;
wherein in response to execution of a first particular instruction, the programmable network is configured to couple together, in a chain, two or more accelerator units of the plurality of accelerator units and to further selectively couple a first accelerator unit of the chain to a given one of the plurality of memory units, thereby providing a datapath for data to flow from one accelerator unit in the chain to a next accelerator unit in the chain without further processor core intervention.

2. The processor as recited in claim 1, wherein in response to execution of a second particular instruction, the programmable network is configured to couple the given one of the plurality of independently accessible memory units to a given one of the plurality of accelerator units.

3. The processor as recited in claim 1, wherein in response to execution of a second particular instruction, the programmable network is configured to couple one or more memory units of the plurality of independently accessible memory units to the processor core.

4. The processor as recited in claim 1, wherein in response to execution of a second particular instruction, the programmable network is further configured to couple the first accelerator unit of the chain to the processor core.

5. The processor as recited in claim 1, wherein each accelerator unit of the plurality of accelerator units, when connected to another accelerator unit in the chain, is configured to communicate with the accelerator unit to which it is connected without further intervention by the processor core.

6. The processor as recited in claim 1, wherein the programmable network includes a plurality of respective interface ports for connection to the processor core, to each of the plurality of memory units, and to each of the plurality of accelerator units.

7. The processor as recited in claim 6, wherein each respective interface port includes a read and write port pair, wherein each of the read and write port pairs includes a read request signal, a data available signal and a plurality of data lines.

8. The processor as recited in claim 1, wherein the processor core further includes a complex execution unit configured to execute complex vector instructions that operate on complex valued data having a real portion and an imaginary portion.

9. The processor as recited in claim 8, wherein the complex execution unit includes a plurality of instruction execution pipelines, each configured to execute a single complex vector instruction per clock cycle.

10. The processor as recited in claim 9, wherein each of the plurality of instruction execution pipelines includes a complex arithmetic logic unit configured to execute the complex vector instructions.

11. The processor as recited in claim 9, wherein the complex execution unit is configured to execute single instruction multiple data (SIMD) instructions.

12. The processor as recited in claim 1, wherein the processor core further includes a complex multiplier accumulator unit configured to perform operations on complex valued data having a real portion and an imaginary portion.

13. The processor as recited in claim 12, wherein the complex multiplier accumulator unit is configured to natively interpret any data as complex valued data.

14. The processor as recited in claim 1, wherein given respective functions of the one or more dedicated functions are associated with different wireless communication standards.

15. The processor as recited in claim 1, wherein each of the plurality of memory units includes an address generation unit configured to generate an address corresponding to a local memory location in response to receiving a read or write transaction.

16. The processor as recited in claim 1, wherein each of the plurality of memory units, the plurality of accelerator units, the processor core, and the programmable network are manufactured on a single integrated circuit.

17. The processor as recited in claim 1, wherein at least some accelerator units of the plurality of accelerator units are configurable hardware implementations of the dedicated functions associated with baseband signal processing.

18. A multimode wireless communication device comprising:
- a radio frequency front-end unit configured to transmit and receive radio frequency signals;
- a programmable digital signal processor coupled to the radio frequency front-end unit, wherein the programmable digital signal processor includes:
  - a plurality of independently accessible memory units;
  - a plurality of accelerator units, each configured to perform one or more dedicated functions;
  - a processor core including an execution unit configured to execute instructions associated with datapath flow control;
  - a programmable network configured to selectively provide connectivity between the plurality of independently accessible memory units, the plurality of accelerator units, and the processor core in response to execution of the instructions;
- wherein in response to execution of a first particular instruction, the programmable network is configured to couple together, in a chain, two or more accelerator units of the plurality of accelerator units and to further selectively couple a first accelerator unit of the chain to a given one of the plurality of memory units, thereby providing a datapath for data to flow from one accelerator unit in the chain to a next accelerator unit in the chain without further processor core intervention.

19. The wireless communication device as recited in claim 18, wherein in response to execution of a second particular instruction, the programmable network is configured to couple the given one of the plurality of memory units to a given one of the plurality of accelerator units.

20. The wireless communication device as recited in claim 18, wherein in response to execution of a second particular instruction, the programmable network is configured to couple one or more memory units of the plurality of independently accessible memory units to the processor core.

21. The wireless communication device as recited in claim 18, wherein in response to execution of a second particular instruction, the programmable network is further configured to couple the first accelerator unit of the chain to the processor core.

22. The wireless communication device as recited in claim 18, wherein each accelerator unit of the plurality of accelerator units, when connected to another accelerator unit in the chain, is configured to communicate with the accelerator unit to which it is connected without intervention by the processor core.

23. The wireless communication device as recited in claim 18, wherein the programmable network includes a plurality of respective interface ports for connection to the processor core, to each of the plurality of memory units, and to each of the plurality of accelerator units.

24. The wireless communication device as recited in claim 23, wherein each respective interface port includes a read and write port pair, wherein each of the read and write port pairs includes a read request signal, a data available signal and a plurality of data lines.

25. The wireless communication device as recited in claim 18, wherein the processor core further includes a complex execution unit configured to execute complex vector instructions that operate on complex valued data having a real portion and an imaginary portion.

26. The wireless communication device as recited in claim 25, wherein the complex execution unit includes a plurality of instruction execution pipelines, each configured to execute a single complex vector instruction per clock cycle.

27. The wireless communication device as recited in claim 26, wherein each of the plurality of instruction execution pipelines includes a complex arithmetic logic unit configured to execute the complex vector instructions.

28. The wireless communication device as recited in claim 26, wherein the complex execution unit is configured to execute single instruction multiple data (SIMD) instructions.

29. The wireless communication device as recited in claim 18, wherein the processor core further includes a complex multiplier accumulator unit configured to perform operations on complex valued data having a real portion and an imaginary portion.

30. The wireless communication device as recited in claim 29, wherein the complex multiplier accumulator unit is configured to natively interpret any data as complex valued data.

31. The wireless communication device as recited in claim 18, wherein the programmable digital signal processor is configured to operate within parameters established by a plurality of wireless communication standards.

32. The wireless communication device as recited in claim 18, wherein at least some accelerator units of the plurality of accelerator units are configurable hardware implementations of the dedicated functions associated with baseband signal processing of signals that conform to a plurality of wireless communication standards.

* * * * *